Sept. 29, 1925.  
G. Q. LEWIS  
FRICTION SHOCK ABSORBING MECHANISM  
Filed Nov. 8, 1922   2 Sheets-Sheet 2
1,555,680
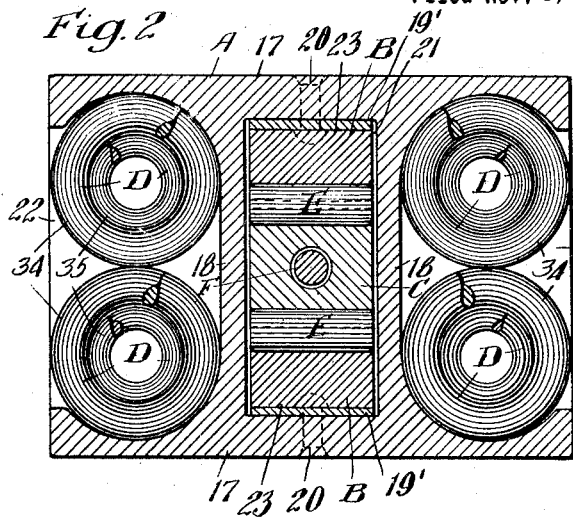
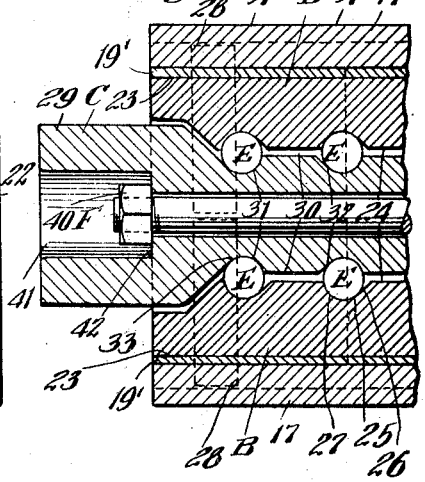
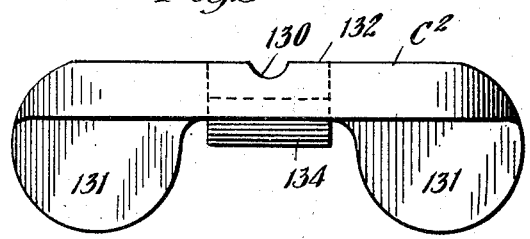
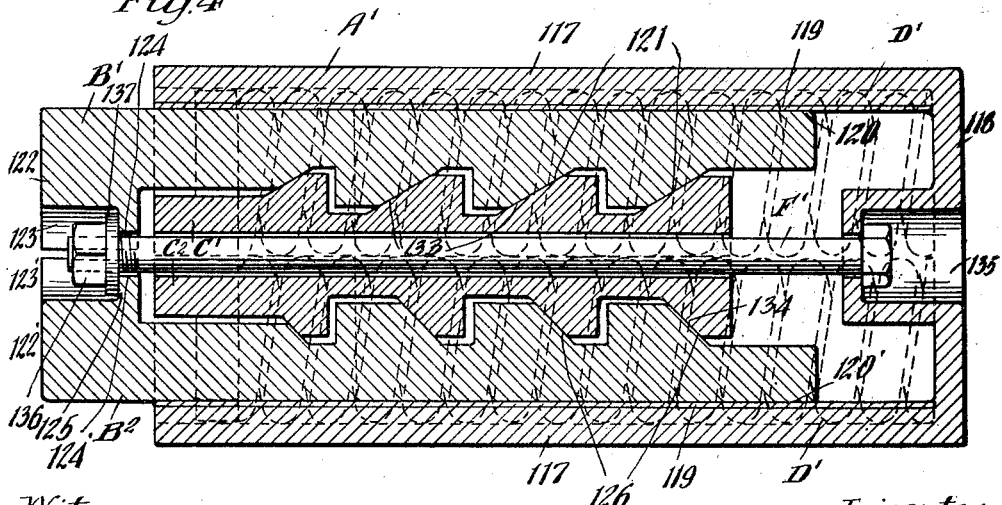
Witness  
Wm. Geiger
Inventor  
Goodrich Q. Lewis  
By Geo. J. Haight  
his Atty.

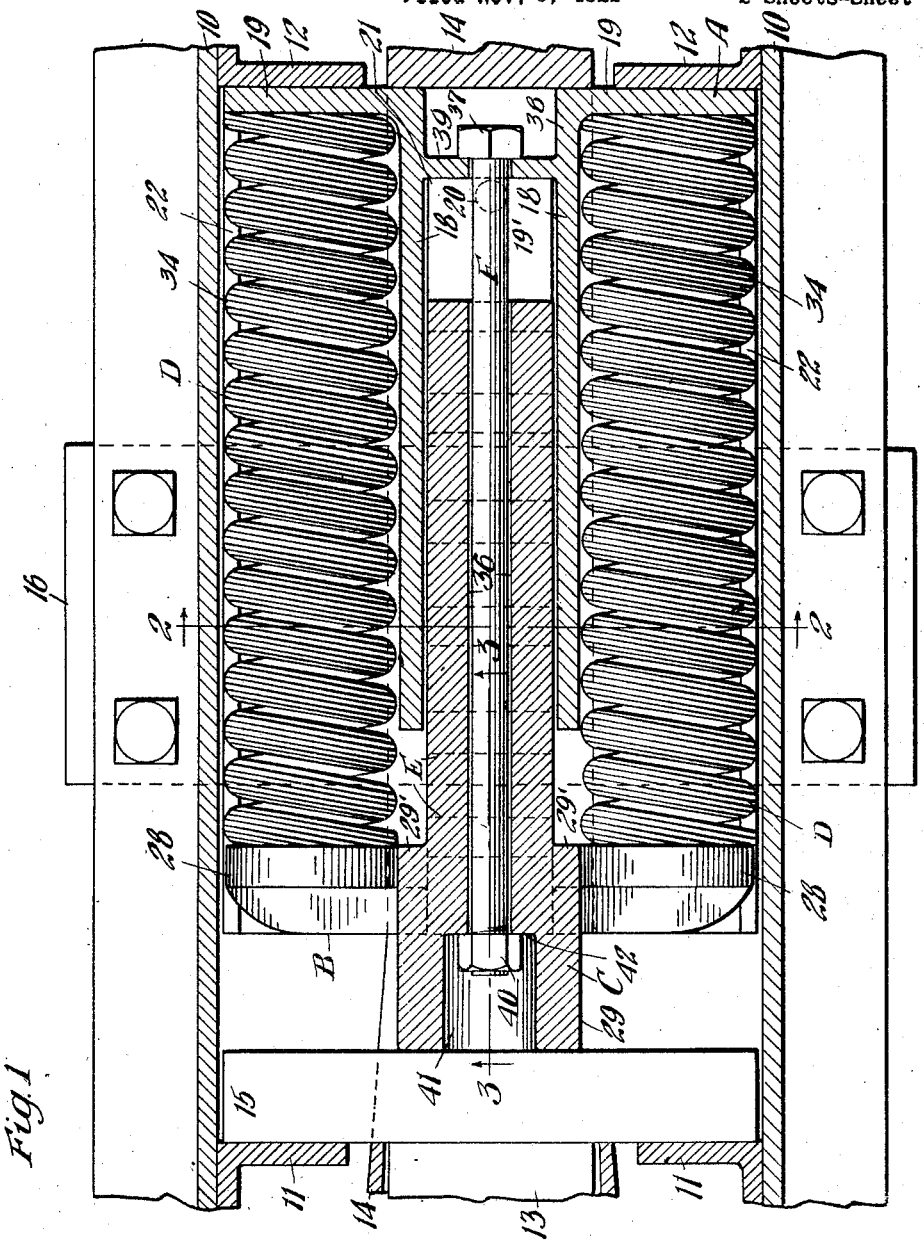

Patented Sept. 29, 1925.

1,555,680

UNITED STATES PATENT OFFICE.

GOODRICH Q. LEWIS, OF WHEATON, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed November 8, 1922. Serial No. 599,625.

*To all whom it may concern:*

Be it known that I, GOODRICH Q. LEWIS, a citizen of the United States, residing at Wheaton, in the county of Du Page and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism, especially adapted for railway draft riggings, wherein are obtained high capacity and compact arrangement, together with large area of friction surfaces.

More specifically the object of the invention is to provide an arrangement of the character indicated, wherein the spring resistance is of a maximum length and disposed longitudinally of the mechanism on opposite sides of centrally disposed friction shoes and wedges, to the end that the friction shoes may be of a length approaching the overall length of the spring resistance and thereby obtain large wearing areas.

Other objects of the invention will more clearly appear from the description and claims hereinafter following.

In the drawings forming a part of this specification, Figure 1 is a horizontal longitudinal sectional view of a portion of a draft rigging showing my improvements in connection therewith. Fig. 2 is a vertical transverse sectional view corresponding substantially to the line 2—2 of Fig. 1. Fig. 3 is a longitudinal vertical sectional view, substantially on the line 3—3 of Fig. 1. Fig. 4 is a longitudinal vertical sectional view of a modification, and Fig. 5 is an end view of one of a pair of central wedge elements used in the modified form shown in Fig. 4.

In said drawing, 10—10 indicate channel draft sills of a railway car, to the inner faces of which are secured front stop lugs 11—11 and rear stop lugs 12—12. A portion of the draw bar is indicated by 13, the same being operatively associated with the shock absorbing mechanism proper, by a hooded cast yoke 14 and to which it is secured by any suitable means, such as a coupler key. 15 indicates a front follower. The shock absorbing mechanism proper, the front follower 15 and the yoke 14 are supported in operative position by a detachable saddle plate 16.

The preferred form of my improved shock absorbing mechanism, as shown in Figs. 1, 2 and 3, comprises, broadly, a friction shell A; a pair of friction wedge shoes B; a centrally disposed wedge element C; two pairs of twin springs D; anti-friction rollers E interposed between the wedge element and the friction shoes; and a retainer bolt F.

The shell A is preferably in the form of a rectangular casting having top and bottom horizontal walls 17—17 connected by longitudinally extending vertically arranged spaced apart central webs 18—18, and a back follower acting wall 19. The casing is open at its forward end and sides to permit insertion of the wedge friction shoes, wedge element and springs. Friction surfaces are provided on the top and bottom walls between the webs 18—18 and consist of steel wear plates 19'—19' secured to the walls 17—17 by any suitable means, such as rivets 20. The webs 18—18 divide the shell into a central friction chamber 21 and a pair of oppositely located outer spring chambers. As clearly shown in Fig. 1, the webs have their outer ends spaced inwardly of the outer end of the shell a proper distance, to co-act with the wedge element to limit the inward movement of the same as hereinafter described, forming, in effect, a stop column.

The friction shoes B are two in number, oppositely disposed, and have longitudinally extending upper and lower friction faces 23 co-acting with the friction faces of the plates 19'. The inner longitudinal faces 24 of the friction shoes B are transversely recessed, as indicated at 25, said recesses having inclined inner wedge faces 26 and outer curved faces 27 forming seats for the anti-friction rollers E. The outer ends of the friction shoes B are each provided with alined oppositely laterally projecting wings 28 forming abutments for the respective pairs of twin springs D.

The wedge element C is located centrally between the shoes B and has its forward end enlarged as indicated by 29, thereby providing shoulders 29'—29' co-acting with the outer ends of webs 18 to positively limit the inward movement of the wedge relatively to the shell. The opposite upper and lower longitudinally extending faces 30 of the wedge element C are transversely recessed as indicated by 31, said recesses being provided with outer wedging faces 32 and inner curved faces 33 adapted to receive the anti-friction rollers E.

Each spring resistance D consists of an outer relatively heavy coil spring 34, and inner relatively lighter coil spring 35, said springs being received within the spring chambers 22 and interposed between the rear wall 19 of the shell and the respective wings 27 of the friction wedge shoes B.

As clearly shown in Figs. 1, 2 and 3 of the drawings, the centrally disposed wedge element C and the opposite friction wedge shoes B are received within the central chamber 21, together with the anti-friction rollers E interposed therebetween, when the parts are in assembled relation.

The retainer bolt F which passes through a longitudinally extending recess 36 within the wedge element C, is adapted to hold the parts in assembled relation. The retainer bolt F has a head 37 at one end, received within a depression 38 formed in the rear wall 19 of the shell and engages with the bottom wall 39 of said depression. The opposite end of the retainer bolt F has a nut 40 screw-threaded thereon, said nut being received within a recess 41, formed in the enlarged end 29 of the friction wedge shoe C, and abutting the inner wall 42 of said recess.

The operation of the mechanism shown in Figs. 1, 2 and 3, is as follows, assuming inward or buffing movement of the draw bar. As the draw bar moves inwardly, thereby moving the follower 15 therewith, the pressure is applied to the wedge element C, thereby immediately producing lateral pressure on the shoes B, whereupon the shoes B are caused to travel inwardly of the shell under the resistance of the springs D and the friction created between the shoes and the inner friction surfaces of the shell, by the wedge action. Upon release, on account of the anti-friction rollers between the shoes B and the wedge element C, the latter substantially instantaneously moves outwardly slightly with respect to the shoes, thereby reducing the spreading or wedging action and allowing the springs to force the wedge friction shoes and central wedge element outwardly.

The modification shown in Figs. 4 and 5, comprises, broadly, a friction shell A'; a pair of friction wedge shoes B'—B² having keen and blunt wedge faces respectively; a pair of centrally disposed wedge elements C' and C² having keen and blunt angle wedge faces co-operating respectively with the keen and blunt faces of said shoes; two pairs of twin springs D'; and a retainer bolt F'.

The shell A' is in all respects similar to the shell A of the preferred form, having top and bottom horizontal walls 117—117 and a back follower acting wall 118. The top and bottom horizontal walls 117—117 are connected by longitudinally extending vertically arranged spaced apart central webs similar to those shown in the preferred construction illustrated in Figs. 1, 2 and 3, thereby providing a central friction chamber and a pair of oppositely located outer spring chambers. The top and bottom walls are provided also with friction wear plates 119 similar to those indicated by 19', in the preferred construction.

The friction wedge shoe B' has a longitudinally extending upper friction face 120 co-acting with the friction plate 119 and is provided on its underside with a plurality of keen angle wedge faces 121. The outer end of the friction wedge shoe B' is provided with a downwardly projecting enlargement 122. The lower face of said enlargement 122 is provided with alined large and small semicylindrical recesses 123 and 124, for the reception of the retaining bolt F'.

The friction wedge shoe B² is also provided with a lower longitudinally extending friction face 120' co-acting with the friction face 119 on the interior of the shell and has its forward end provided with an upwardly projecting enlargement 122' provided with alined recesses 123' and 124' similar to the recesses formed in the wedge friction shoe B' and registering therewith. The upper face of the friction wedge shoe B² is provided with a plurality of relatively blunt angle wedge faces 126, adapted to co-act with the wedge element C².

Interposed centrally between the wedge friction shoes B' and B² are a pair of wedge elements C' and C². The wedge elements C' and C² are provided with longitudinally extending central registering grooves 130 to receive the retainer bolt F'. Each of the wedge elements C' and C² is provided at its outer end with alined oppositely extending laterally projecting wings 131, similar to the wings 28 of the preferred construction and serving as abutment members for the springs D'. The inner faces 132 of the wedge elements C' and C'' are flat and are arranged in face to face contact. The wedge element C' is formed with a plurality of keen wedge faces 133, co-acting with the keen wedge faces of the wedge friction shoe B' and the wedge element C² is provided with blunt wedge faces 134 co-acting with the blunt wedge faces of the friction wedge shoe B².

The spring elements D' comprise outer heavy springs and inner relatively lighter springs similar in all respects to the springs shown in connection with the preferred form of the invention and are similarly interposed between the wings 131 of the wedge elements C' and C² and the rear wall 118 of the shell. The wedge friction shoes B' and B², and the wedge elements C' and C² are received between vertically extending central webs similar to those indicated by 18—18 in the preferred form.

The retainer bolt F' has its head received within a recess 135 in the rear wall of the shell and is in abutment with the bottom wall of said recess. Said bolt is extended between the wedge elements C' and C², being received within the registering recesses 130 and has threaded upon its opposite end, a retaining nut 136 bearing on a washer 137 seated against the walls 125 in the bottom of the recesses 123—123', thus holding the parts in assembled relation.

The operation of the mechanism shown in Figs. 4 and 5, assuming a compression stroke in buffing, is as follows. As the draw bar moves inwardly, the front follower will move in unison therewith, thus applying pressure to the two wedge-friction-shoes B' and B². The latter obviously will move inwardly at the same rate as the draw bar and front follower. The effective wedging or spreading action will occur on the keen angle, true wedge faces of the shoes B' and wedge element C', that is, such slippage as occurs in the wedging or spreading action will take place upon the engaging faces of said members, thus allowing the shoe B' to advance slightly longitudinally with respect to the wedge element C'. On account of the blunt angle faces of the other shoe B² and wedge element C², no relative longitudinal movement or appreciable amount of longitudinal movement can occur between them, from which it will be seen that the wedge element C² will be necessarily advanced, slightly, longitudinally with respect to the wedge element C'. This action is permitted by reason of the fact that the two wedge elements C' and C² are formed separately with possibility of sliding one on the other and also by reason of the further fact that each of said wedge elements C' and C² is yieldingly resisted by independent sets of twin arranged springs. Inasmuch as the two wedge elements C' and C² are in engagement with each other, transverse wedging action or spreading action will be communicated equally to both shoes B' and B², thus creating the desired friction between the shoes and the shell. During the compression stroke, there will be a slight expansion of the friction shell in a vertical direction, which will store up a certain amount of energy within the shell casting. This energy, when the actuating force is discontinued, is effective in the reverse direction, that is, the shell tends to contract, thereby imposing forces radially inwardly toward the center of the shell. These forces then extend at a comparatively acute angle with respect to the blunt angle faces of the wedge member C² and shoe B², the shoe B² can fall away from the wedge element C², after the actuating compression force is discontinued, which further facilitates the collapse of the friction wedge system, whereupon the two sets of springs become effective to project all of the parts outwardly to normal position including the restoration of the relative position of the two wedge members C' and C².

By arranging the parts as shown and described, both in the preferred form and modification, I am enabled to provide twin springs arranged in pairs, each of a maximum length and also to employ friction shoes of a maximum length, thereby making use of the entire length of the friction surfaces of the shell for active work, thus obtaining greater friction wearing areas than heretofore in a mechanism employing a wedge system between the shoes, and all of which elements are movable lengthwise of the shell.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a follower friction shell having interior friction surfaces corresponding in length to the interior length of the shell; wedge friction shoes cooperable with said shell friction surfaces; wedge means co-operable with said shoes; and a spring resistance compressible in a direction lengthwise of the shell, said spring extending from the rear wall of the shell to the forward end of said shoes; and means for transferring the resistance of said spring to said shoes.

2. In a friction shock absorbing mechanism; the combination with a friction shell having interior friction surfaces; of co-acting inner and outer wedge members within said shell; abutment means at the rear end of the shell; and springs extending longitudinally of the shell from said abutment means to the forward end of said wedge members, said springs being arranged on opposite sides of said wedge members for yieldingly resisting movement of said wedge members inwardly of the shell, said outer wedge members having friction surfaces coacting with the friction surfaces of the shell.

3. In a friction shock absorbing mechanism, the combination with a shell having interior friction surfaces; of a pair of oppositely disposed wedge friction shoes coacting with said shell friction surfaces, one of said shoes having, with reference to the longitudinal axis of the mechanism, keen wedge faces, and the other of said shoes having, with reference to the longitudinal axis of the mechanism, blunt wedge faces; a centrally disposed pair of wedges having respectively keen and blunt angle wedge faces with reference to the longitudinal axis of the mechanism, cooperating respectively with the keen and blunt angle wedge faces of said shoes; a spring resistance arranged longitudinally of the shell; and means on the forward end of said wedges for transferring the resistance of said spring resistance to said shoes.

4. In a friction shock absorbing mechanism, the combination with a casting having a longitudinally extending friction chamber; of wedge-friction-shoes cooperable with the friction surfaces of said friction chamber, one of said shoes having wedge faces extending at a relatively keen angle with respect to the line of applied compressing forces and another shoe having faces inclined at a relatively blunt releasing angle with respect to the line of applied compressing forces; wedge elements cooperating with said shoes and having correspondingly inclined keen and blunt angle faces respectively, said wedge elements being adapted for relative movement longitudinally; and spring means for yieldingly resisting relative movement between the system of friction members and the friction chamber.

In witness that I claim the foregoing I have hereunto subscribed my name this 17th day of October, 1922.

GOODRICH Q. LEWIS.